US012574610B2

(12) United States Patent
Rund

(10) Patent No.: US 12,574,610 B2
(45) Date of Patent: Mar. 10, 2026

(54) ARTIFICIAL INTELLIGENCE SYSTEM FOR PERSONALIZED AND SYNTHETIC ADULT CONTENT GENERATION WITH REAL-TIME CONSENT AND DYNAMIC CONTENT CUSTOMIZATION

(71) Applicant: Tyler Rund, Leavenworth, KS (US)

(72) Inventor: Tyler Rund, Leavenworth, KS (US)

( * ) Notice: Subject to any disclaimer, the term of this patent is extended or adjusted under 35 U.S.C. 154(b) by 0 days.

(21) Appl. No.: 19/004,846

(22) Filed: Dec. 30, 2024

(65) Prior Publication Data

US 2025/0310617 A1    Oct. 2, 2025

Related U.S. Application Data

(60) Provisional application No. 63/629,980, filed on Mar. 30, 2024, provisional application No. 63/629,981, filed on Mar. 30, 2024.

(51) Int. Cl.
*H04N 21/80* (2011.01)

(52) U.S. Cl.
CPC .................................. *H04N 21/80* (2013.01)

(58) Field of Classification Search
None
See application file for complete search history.

(56) References Cited

U.S. PATENT DOCUMENTS

2021/0352369 A1 * 11/2021 Savage ................ G11B 27/031
2025/0258892 A1 * 8/2025 Baily .................... G06F 21/107
2026/0023836 A1 * 1/2026 Cheung ................... G06F 21/32

FOREIGN PATENT DOCUMENTS

KR        102833430 B1 * 7/2025 .............. H04W 4/12

* cited by examiner

*Primary Examiner* — Omar S Parra
(74) *Attorney, Agent, or Firm* — Nyemaster Goode, P.C.

(57) ABSTRACT

A system and method for automatically generating customized adult content that conforms to content provider determined settings and incorporates a digital likeness of a content provider. The adult content generation system comprises a content consumer system which has an artificial intelligence system. The adult generation system has a content provider system with a dynamic consent management subsystem and content provider determined settings that determine how a digital likeness is used. The content generation subsystem receives input from a content consumer with parameters for generating adult content. The input is analyzed for compliance with content provider determined settings. The artificial intelligence system then creates and displays the customized adult content to the content consumer. The customized adult content conforms with both the input parameters and the content provider determined settings.

20 Claims, 8 Drawing Sheets

FIG. 3

USER SELECTS OR ENTERS INPUT PROMPTS INTO THE ADULT CONTENT GENERATION SYSTEM — 32

SYSTEM CHECKS IF CONTENT GENERATED FROM PROMPT VIOLATES COMPLIANCE OR LEGAL GUIDELINES — 34

SYSTEM GENERATES CONTENT — 36

USER OPTIONALLY PREVIEWS CONTENT — 38

CONTENT FINALIZED — 40

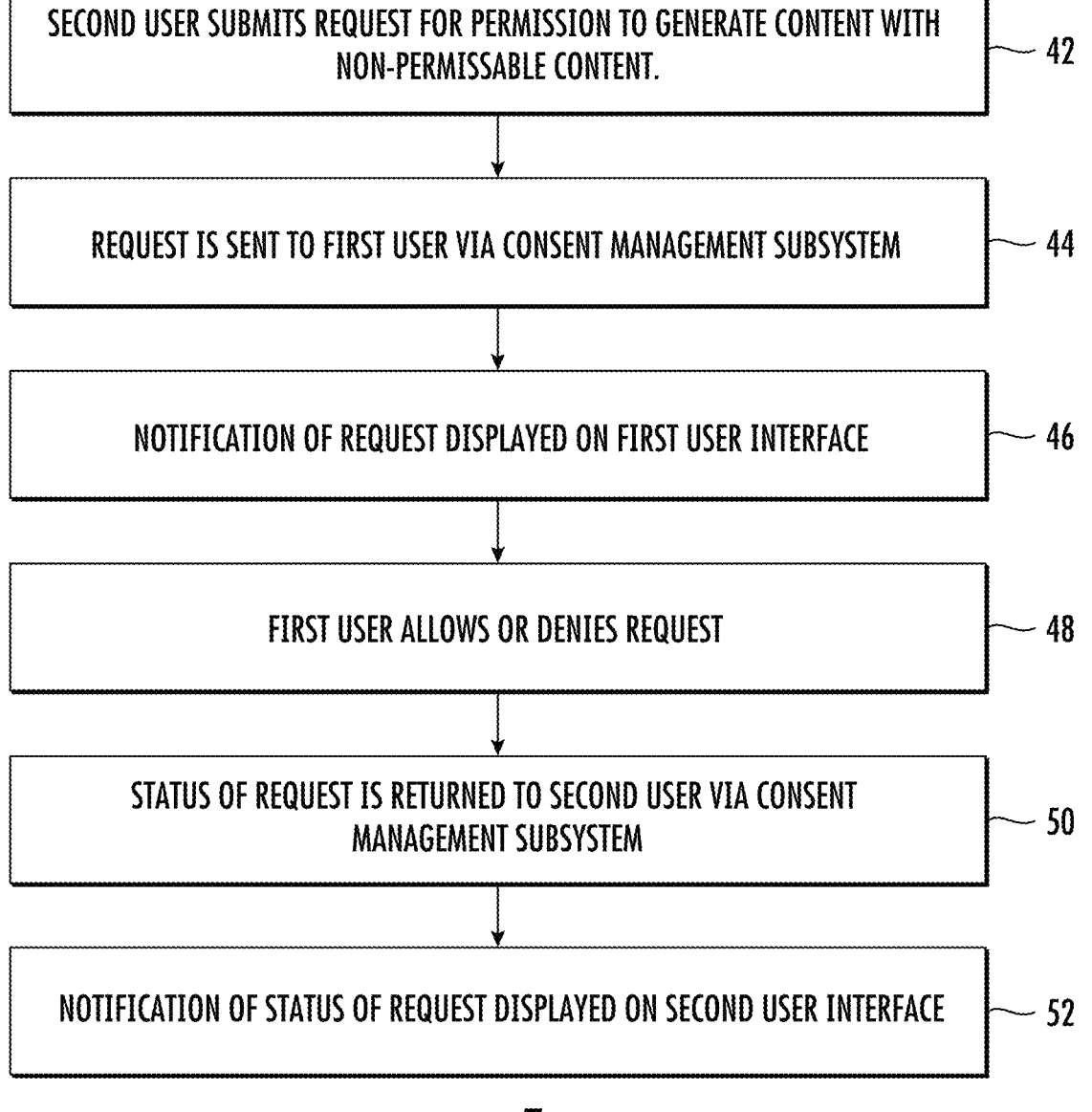

SECOND USER SUBMITS REQUEST FOR PERMISSION TO GENERATE CONTENT WITH NON-PERMISSABLE CONTENT. — 42

REQUEST IS SENT TO FIRST USER VIA CONSENT MANAGEMENT SUBSYSTEM — 44

NOTIFICATION OF REQUEST DISPLAYED ON FIRST USER INTERFACE — 46

FIRST USER ALLOWS OR DENIES REQUEST — 48

STATUS OF REQUEST IS RETURNED TO SECOND USER VIA CONSENT MANAGEMENT SUBSYSTEM — 50

NOTIFICATION OF STATUS OF REQUEST DISPLAYED ON SECOND USER INTERFACE — 52

FIG. 7

ARTIFICIAL INTELLIGENCE SYSTEM FOR PERSONALIZED AND SYNTHETIC ADULT CONTENT GENERATION WITH REAL-TIME CONSENT AND DYNAMIC CONTENT CUSTOMIZATION

CROSS-REFERENCE TO RELATED APPLICATIONS

This application claims priority to U.S. Provisional Application No. 63/629,981, filed on Mar. 30, 2024, entitled "AI-BASED PERSONALIZED ADULT CONTENT SYSTEM," and to U.S. Provisional Application No. 63/629,980, filed on Mar. 30, 2024, entitled "AI-BASED PERSONALIZED ADULT CONTENT SYSTEM", the entire disclosures of which are hereby incorporated herein by reference.

BACKGROUND

The Internet allows instant access to nearly any type of image or video imaginable. Many social medial platforms allow content creators to create and upload content (e.g., images and videos) of themselves. It is important for content creators to have control over this content. This control is important for all types of images and videos, but it is especially so for explicit content. Historically, the adult entertainment industry has been fraught with concerns over consent and the exploitation of content creators, often overshadowing the potential for positive and consensual expressions of sexuality. Traditional models of content creation in this sector have not only been labor-intensive but have also placed individuals, especially young men and women, in potentially exploitative situations. In some situations, a content creator (sometimes referred to herein as a participant) featured in explicit content loses control over the content after it has been uploaded to the Internet. The content could be shared with third parties without the consent of the participant. This may be embarrassing and/or damaging to the reputation of participant if the content is intended to be private, and it may lead to loss of revenue for content intended to be commercial. While some models exist for a participant to control how their content is used, such as subscriptions services like ONLYFANS, the participant may not have the ability to stop others from saving the content off site. Furthermore, there is no guarantee third parties will not be able to view or obtain the content.

In some situations, a participant may wish to share content with one or more select people. For example, if two people are in a relationship with each other, one of them may wish to share content, which may be explicit content, with the other person. There is a need for the participant to be able to control the content long after it was created and sent to the other person. For example, in a situation where the relationship ends, the participant needs to be able to recall or delete the content from the other person's phone or computer.

There are other situations where it is desirable for a content creator to give an artificial intelligence engine permission to create content having artificial image of the participant. A content creator may be limited in the number of photographs or videos he/she can create and upload. For example, if partners in a relationship are separated for a long time, such as soldiers on deployment and their significant others, there can be an increased demand for intimate contact which cannot be met by the content creator. Additionally, if a content creator is selling their content, they may not be able to keep up with demand, especially if creating content is not their full-time job.

As the field of artificial intelligence (AI) advances and grows, it has become capable of generating a wide range of content and has become far easier for any lay person to use it. As this occurs, a number of legal and ethical issues arise. There are concerns of personal data being used to train AI, violating people's privacy. There is also the possibility that AI may generate content showing a real person's likeness. So called "deep fakes" can show pictures or videos of real people in situations that did not occur, all the while appearing real if not heavily inspected. Deep fakes can be used malicious, or even illegal purposes. For example, a politician could be featured in a deep fake video wherein they do something illegal/compromising. This could threaten their job, even though they did not do anything wrong in reality. Users could train an AI engine to create content involving minors, which may be made using the likeness of real-life children whom cannot consent or prevent other from exploiting them for this purpose.

There is therefore a need for a system integrating a generative artificial intelligence to create and selectively manage content, particularly in the case of content of a romantic or sexual nature. There is also a need to share the ability for others to make content involving a person's likeness, while simultaneously giving control over how the person's likeness is used to the person having the likeness. There is also a need to create and share content based on relationship between two people.

SUMMARY

One aspect of the present disclosure is a method of automatically generating customized adult content. The customized adult content conforms to one or more content provider determined settings. The first step is providing an overall adult content generation system. The overall adult content generation system includes a content consumer system with a content consumer graphical user interface and a content provider system with a content provider graphical user interface. The content consumer system comprises a content generation subsystem with a generative artificial intelligence system. The content provider system comprises a digital likeness corresponding to a content provider. The digital likeness appears identically or at least similarly to the physical, real-life appearance of the content provider. The digital likeness may not only conform to the content provider's physical appearance, but may have audio that sounds substantially the same as the content provider's voice. There is also a dynamic consent management subsystem which stores defined relationships between the content provider who owns the digital likeness and at least one content consumer. Content provider determined settings are also included in the dynamic consent management subsystem. The content provider determined settings are shared by the dynamic consent management subsystem with the content generation subsystem and are applied to the digital likeness. A content consumer is able to change the digital likeness when they have the system generate content, but the changes must conform to the content provider determined settings. The next step includes the content generation subsystem receiving an input from a content consumer using a content consumer operated computer input device. The input is at least one content consumer determined parameter for generating adult content that includes the digital likeness and is artificially generated by the generative artificial intelligence system. In another step, the content generation subsystem analyzes the input to verify that the input conforms to the content provider determined settings. If the input conforms to the content provider determined settings, then the generative artificial intelligence system automatically generates customized adult content using the generative artificial intelligence system if the input conforms to the content provider determined settings. The customized adult content is displayed on a computing device operated by the content consumer, and the customized adult content conforms to the content consumer determined parameter of the input. The content consumer graphical user interface is displayed to the content consumer on a display of the computing device operated by the content consumer.

Another aspect of the present disclosure includes a method of automatically generating customized content. The customized content conforms to content provider determined settings. The method is performed using an overall content generation system having a content consumer system with a content consumer graphical user interface and a content providing system with a content provider graphical user interface. The content consumer graphical user interface is displayed to the content consumer on a display of the computing device operated by the content consumer. The content consumer system includes a content generation subsystem having a generative artificial intelligence system. The content provider system includes at least one digital object. The digital object is typically a digital representation or likeness of an existing person, but it could be any object to which a content provider owns or controls. There is also a dynamic permission management subsystem having one or more defined relationships between the content provider and at least one content consumer. The content provider determined settings are stored in the dynamic permission management subsystem as well, and the content provider determined settings are shared by the dynamic permission management subsystem with the content generation subsystem. The content provider determined settings determine how the digital object is used. In a first step, the content generation subsystem receives an input from a content consumer using a content consumer operated computer input device, where the input is at least one content consumer determined parameter for generating content that includes the digital object. The content is artificially generated by the generative artificial intelligence system according to the content consumer determined settings. The next step includes analyzing the input using the content generation subsystem to verify that the input conforms to the content provider determined settings. In the following step, the generative artificial intelligence system automatically generates content based on the input, as long as the input conforms to the content provider determined settings. The customized adult content is displayed to the content consumer on a display of a computing device operated by the content consumer. The customized content conforms to the at least one content consumer determined parameter of the input.

Yet another aspect of the present disclosure is a content creation and management system for the creation of customized content involving a digital likeness owned by a content provider. It includes a content consumer system with a content consumer graphical user interface that is displayed to a content consumer on a display of a content consumer operated computer system. The content consumer system includes a content generation subsystem and a request creation subsystem. The content generation subsystem has a generative artificial intelligence system for producing customized content according to content consumer prompts. The request creation subsystem is in communication with the content generation subsystem such that the request creation subsystem may be accessed by the content consumer while the content generation subsystem is generating content. The request subsystem enables the content consumer to request access to certain features or permissions from the content consumers. The content creation and management system also includes a content provider system with a content provider graphical user interface that is displayed to the content provider on a display of a content provider operated computer system. The content provider system includes a dynamic permission management subsystem and a request management subsystem. The dynamic permission management subsystem includes a digital likeness management subsystem, wherein the digital likeness management subsystem has at least one digital likeness corresponding to the content provider. The digital likeness has a digital visual appearance that corresponds to a physical, real-life appearance of the content provider. The dynamic permission management subsystem also includes at least one relationship defined between the content provider and a content consumer, as well as a content provider determined setting. The content provider determined setting is associated to the digital likeness, so that alterations and usage of the digital likeness is determined by the content provider determined setting. The content provider determined setting also relates to the at least one relationship, so that it may different based on the particular relationship. Each other user that the content provider has a relationship with is listed in this subsystem alongside a summary of the relationship and their permissions. The content provider may select a particular user to open a permission menu where the selected user's permissions may be altered, possibly by toggling any number of preexisting options. The users may have a profile photo or avatar for easy identification. There is also a request management subsystem in signal communication with the request creation subsystem. The request management subsystem accesses the at least one content provider determined setting. The content creation and management system are stored on an external server separate from the content consumer operated computer system and the content provider operated computer system. Requests are sent by the content consumers whenever they want to generate content that does not conform to the content provider determined settings. Requests are received by the content provider in the request management subsystem, whereupon the content provider may approve or deny the request.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a diagram showing how the system of the present disclosure is able to grant, adjust, and revoke consent relating to a series of features of a digital likeness, as well as granting specific permissions to certain features and scenarios.

FIG. 7 is a process flow diagram of the process of creating and approving/denying requests for permission within the systems of the present disclosure.

DETAILED DESCRIPTION OF EMBODIMENTS

To the extent the terms "includes" or "including" or "have" or "having" are used in the specification or the claims, it is intended to be inclusive in a manner similar to the term "comprising" as that term is interpreted when employed as a transitional word in a claim. Furthermore, to the extent the term "or" is employed (e.g., A or B) it is intended to mean "A" or "B" or both "A" and "B". When the Applicant intends to indicate "only A or B but not both" then the term "only A or B but not both" or similar structure will be employed. Thus, use of the term "or" herein is the inclusive, and not the exclusive use. Also, to the extent the terms "in" or "into" are used in the specification or the claims, it is intended to additionally mean "on" or "onto." In this specification and the appended claims, the singular forms "a," "an" and "the" include plural reference unless the context clearly dictates otherwise.

Figure 1:
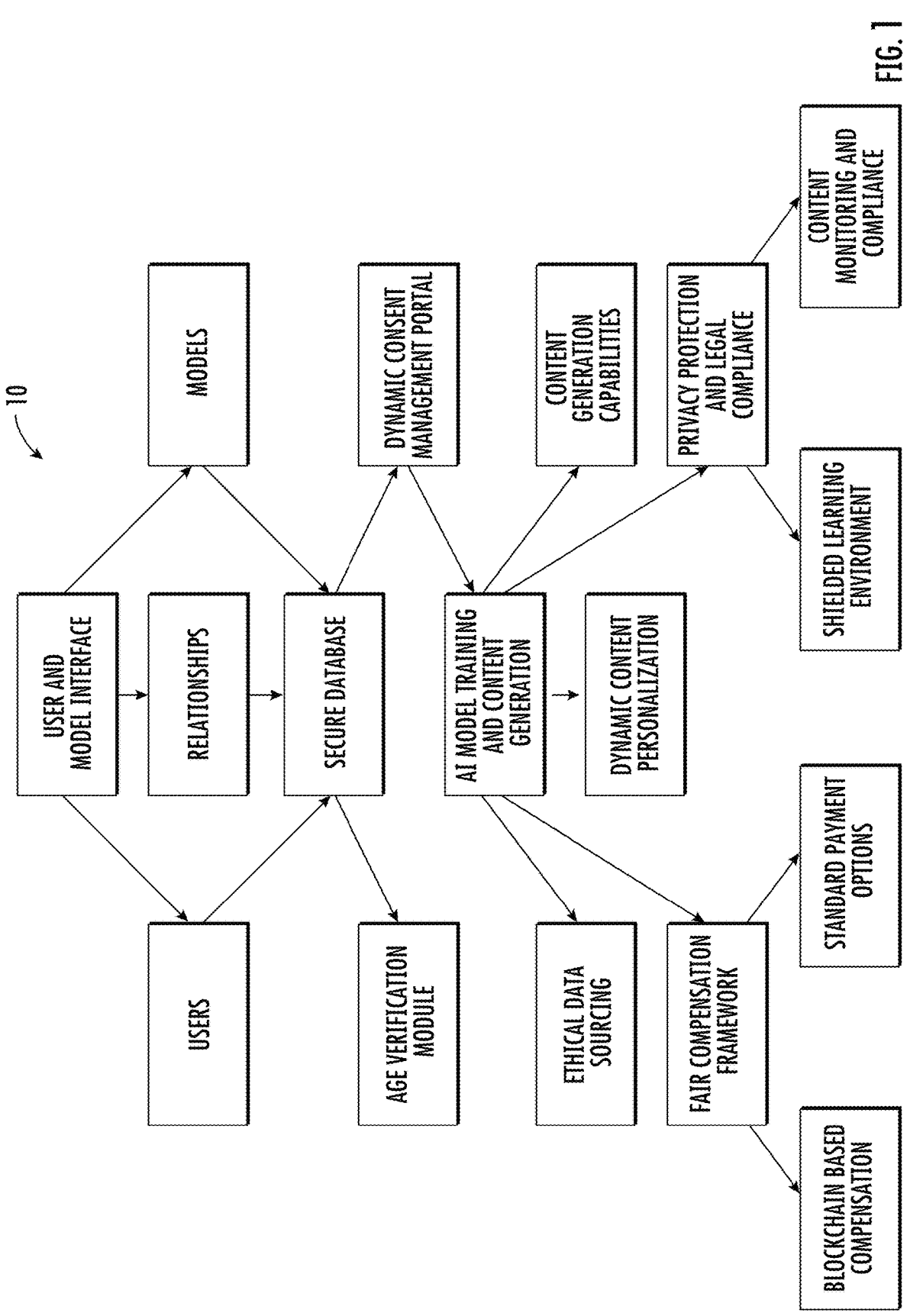
FIG. 1 is a diagram showing features of the overall adult content generation system are related according to an aspect of the present disclosure.
Figure 2:
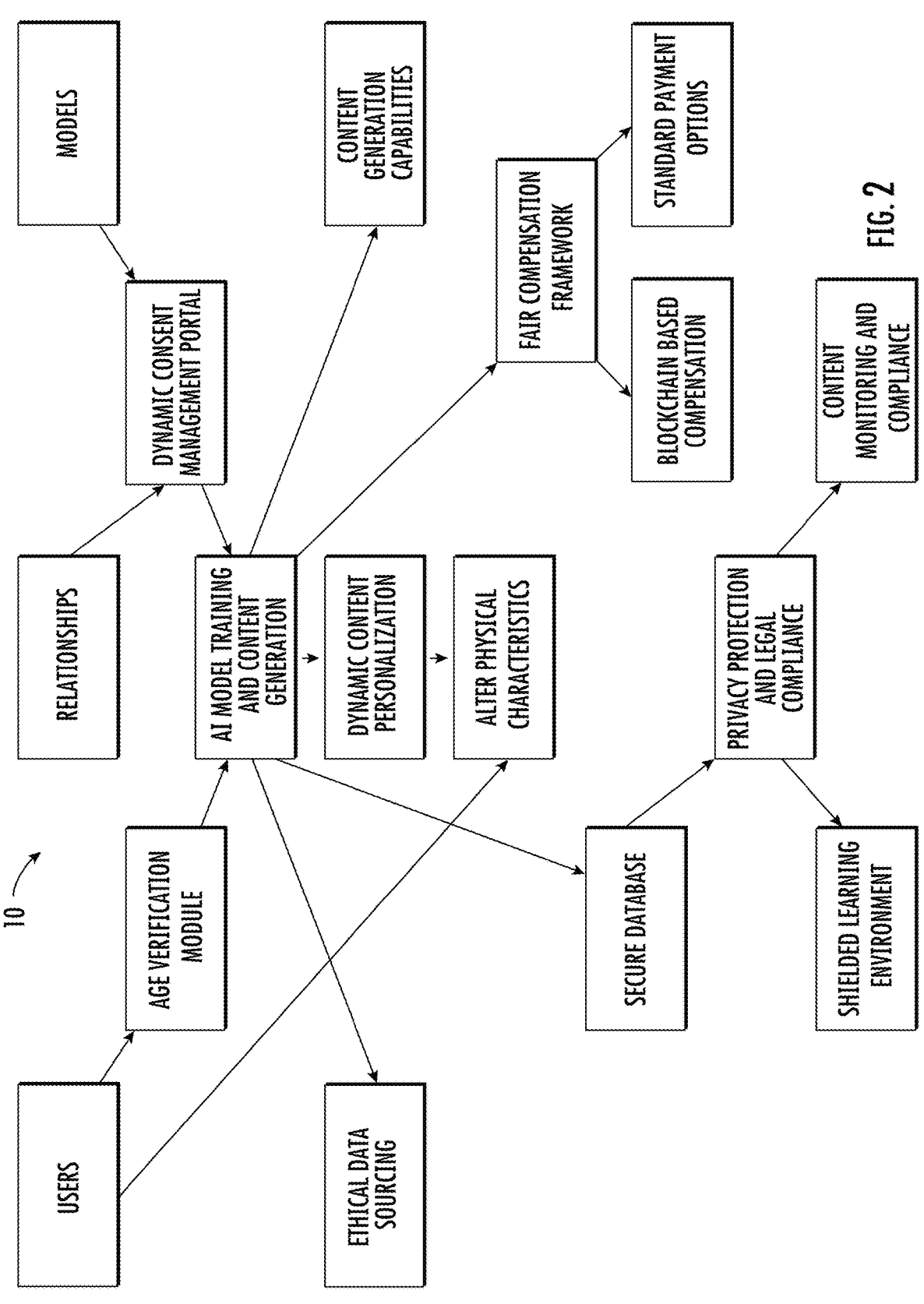
FIG. 2 is a diagram showing features of the overall adult content generation system are related according to an aspect of the present disclosure.

The personalized adult content generation system 10, as shown in FIGS. 1-2, allows a user to give other users or customers access to their own likeness in order to generate audio and/or visual content such as sound recording, still images, and videos. The content is described herein in connection with adult or sexual content; however, the disclosure is intended to cover content which is not adult/sexual/explicit in nature. As used herein, the content provider is sometimes referred to as the content creator or the participant, or in some cases a model. The other user is sometimes referred to as the second user or the content recipient/content consumer. In the personalized adult content generation system 10, a content and consent relationship is established between at least two users. The content provider, generally referred to as a content creator, model user, or content provider, provides their appearance and physical features for content generation to a second user. The second user, whom generates content using the content provider's digital likeness, is generally referred to as a content consumer or receiving user. Effectively, a content provider would have their own "digital likeness" stored within the system which may correspond to their real-life physical appearance. The digital likeness may be very accurate, only limited by the quality of the system or training data, or it may deviate from the content provider's real-world appearance to varying degrees. In some embodiments, the digital likeness may also incorporate more than a content provider's physical appearance. It may include a content provider's voice, facial and emotional expressions, and certain mannerisms/behaviors of the content provider. The system relationship does not need to be unidirectional. Both the content provider and content consumer may have their own digital likeness stored in the system, with the ability for both the provider and consumer involved to make adult AI generated content with one another's digital likenesses. To assist the AI system, the content provider would submit content that features themselves in it. The content may be composed of images, videos, audio, or combinations thereof. Audio/video samples help the AI to create an accurate representation of the content provider's real-life voice and mannerisms. The media may depict the user in various scenarios or with slightly different appearances. The content provider may be in various stages of undress, or their hair may be different, for example. In other situations, the content provider may use written text to describe their physical appearance, and may also use text to prompt the AI in changing the digital likeness to suit their needs/wants. The content provider may ask the AI to change the skin tone or weight of the digital likeness, as examples.

In one embodiment, the systems 10 of the present disclosure enable a couple in a romantic relationship to maintain intimacy over long distances. One example contemplated by the present disclosure is a military service member who is separated from their spouse or partner while they are deployed. An exemplary content provider is a spouse of a military service member that provides their digital likeness to the exemplary content consumer, whom is the military service member on deployment and separated from physical contact with the content provider. In other cases, the content provider may be a person who is commercially providing access to the appearance for monetary gain (e.g., ONLY FANS or other social media networks). A model for adult content is envisioned by the present disclosure. The model would provide their physical appearance to other content consumers/users, typically a plurality of other content consumers/users, in order for those users to create personalized content of the model's actual likeness.

Users, which may be content providers, content consumers, or both, access the personalized adult content generation system 10 through a login portal. Users will need an account in order to use the system, and use their account information to log into the portal. The portal may use multifactor authentication in addition to the login information to ensure the user is who they say they are. Users may need to authenticate by inputting a code sent to them via email, phone call, or short message service (SMS) messages. Both users that utilize the system for modeling or for their relationship may log into the system using the same login portal. However, in alternative embodiments, there will be a separate login portal for models, which provides access to a version of the system with a payment subsystem. User accounts may have a type associated with it indicating whether or not it is a modeling account. The user may be able to change the type of account at any point after it is created. A user could also have an account for each type, but link them together. A single user may have a commercial revenue generating modeling account, and a relationship account which provides separate access to a significant other. Multiple linked accounts may have overlapping permissions and content.

Figure 8:
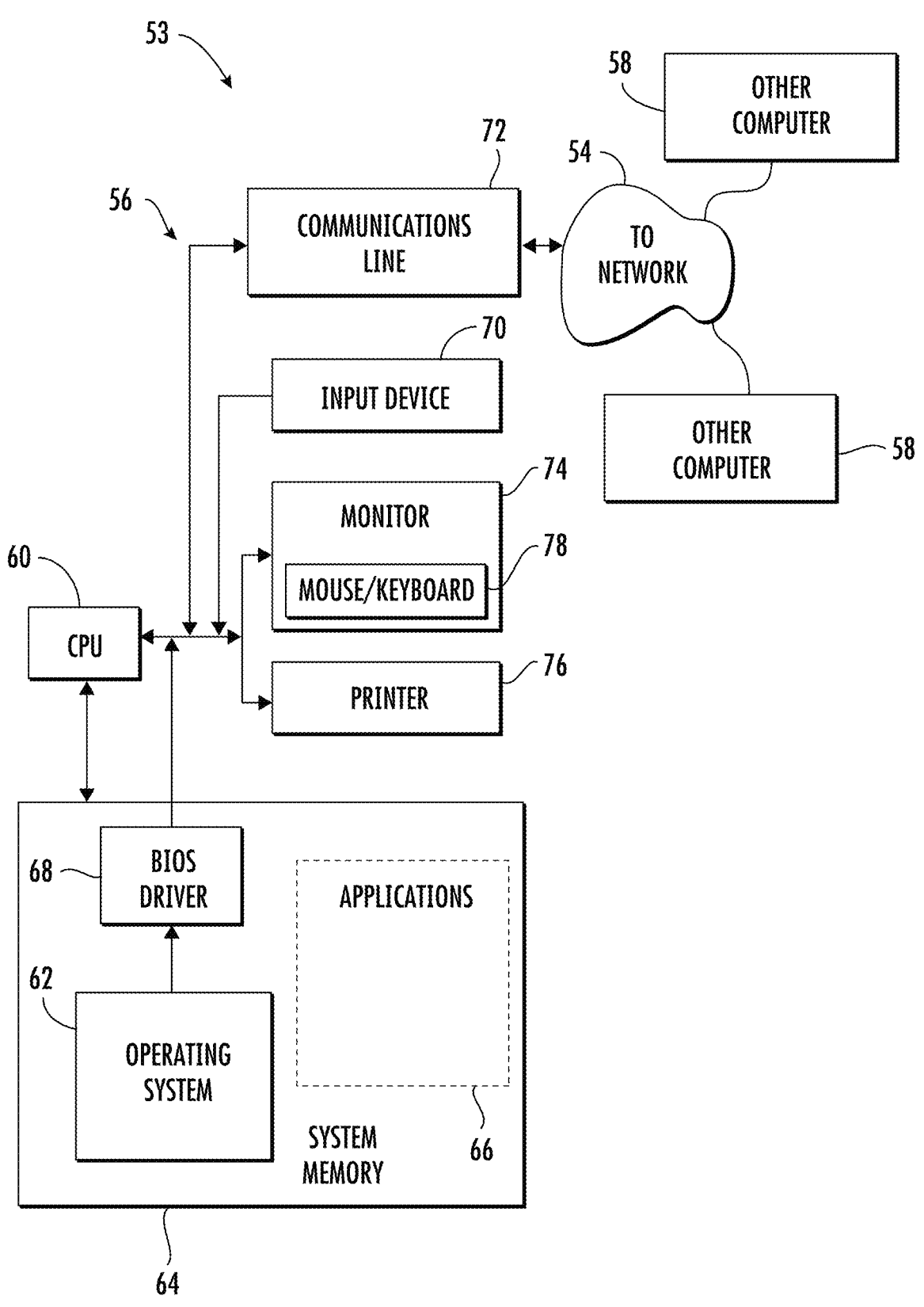
FIG. 8 is a diagram of an exemplary computer system that may implement the overall adult content generation system according to an aspect of the present disclosure.

Systems of the present disclosure are generally implemented by a computing system having a non-transitory computer readable storage medium. The computer readable storage medium can be, for example, but is not limited to, an electronic storage device, a magnetic storage device, an optical storage device, an electromagnetic storage device, a semiconductor storage device, or any suitable combination of the thereof. In some cases, the computer readable storage medium is not integrated into the computing system, and is instead configured to interface with the computing system, such as a thumb drive. The computer readable storage medium may be a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, or a floppy disk. The systems of the present disclosure are typically held on an external server separate from a user operated computing system. This ensures that the system is accessible on any device and from anywhere with an internet or WIFI connection. The system is able to be scaled up as it is updated over time or as new content is created and stored on it. In some embodiments, the system is a fully cloud-based solution, a hybrid model with local and remote components, or a fully local installation FIG. 8 illustrates the components of a general-purpose computing system 53 connected to a general-purpose electronic network 54, such as a computer network. The computing system is typically a user operated personal computing device. In preferred embodiments of the disclosure, the computing device is a computer, possibly a desk top computer or laptop, or it is a mobile computing device, such as a smart phone or tablet. The computer network can be a virtual private network or a public network, such as the Internet. In the case of the systems of the present disclosure, network(s) can be any one or any combination of Local Area Network (LAN), Wide Area Network (WAN), WiMAX, Wi-Fi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks. Computer readable instructions can be downloaded from the network. The network allows the computing device to interact with the external server where adult content and consent settings 20 are stored, as well as other computing devices 58 in the network. As shown in FIG. 8, the computer system 53 includes a central processing unit (CPU) 60 connected to a system memory 64. The system memory 64 typically contains an operating system 62, a BIOS driver 68, and application programs 66. In addition, the computer system 53 contains input devices 70 such as a mouse or a keyboard 78. However, the input device may be a trackball; touchpad; joystick; graphics tablet; a scanner; a touch sensitive screen that may be incorporated into a display or displays; audio input devices such as voice recognition systems and microphones; and any other device that provides a way for a user or users to provide/input information into a computer system 53. The computer system 53 also includes output devices such as a printer 76 and a display monitor 74, and a permanent data store, such as a database, which may onboard the computing device or on an external server. Instead of a display monitor 74, the user may view content made by the system using a virtual reality (VR) or augmented reality (AR) device, such as a VR headset. The computer system 53 generally includes a communications interface to communicate to the electronic network 54. Other computer devices 58 also connect to the electronic network 54 which can be implemented as a Wide Area Network (WAN) or as an internetwork, such as the Internet. Data is stored either in many local repositories and synchronized with a central warehouse optimized for queries and for reporting, or is stored centrally in a dual use database. This system is one example of a system that could execute the method steps set forth above.

The personalized adult content generation system 10 of the present disclosure may be implemented as a web-based solution that is accessible through a web browser, or may be implemented as a software application on a user operated computing device, which may be a mobile device. All features of the system are available in either configuration, although the screen configurations of mobile devices will have the layout shifted to a compact design with collapsible menus, swipe able panels, and touch-friendly controls for navigation and interaction with the digital likeness. The system will also be automatically updated, as modifications to the system are made, although mobile users may need to give the application permission to update. The system also provides native applications for Windows, macOS, iOS, and Android devices. These apps are optimized to leverage the specific capabilities of desktop and mobile platforms, push notifications, enhanced performance for 3D rendering, and possibly touchscreen capabilities.

The personalized adult content generation system 10 of the present disclosure includes a content generation subsystem 26 having a generative artificial intelligence (AI) system in order to automatically create content in response to content consumer prompts. A second user/content consumer, or possibly customer/subscriber, uses the generative AI to create artificial content involving the digital likeness of a content provider or model. In order to create the digital likeness, the content provider input media with themselves featured in it into the system. The media may be images, video, textual information, etc. Once created, the digital likeness may be inserted realistically into adult scenarios by the generative AI system according to content consumer prompt. The content may be generated using the digital likenesses of other content providers along with the original content provider's digital likeness, or even the content consumer's digital likeness if they have a digital likeness set up. Both the content provider and content consumer in relationship could serve as a digital likeness providing user having digital likenesses for the other to use. Because the content is generated automatically, it allows content consumers to quickly get personalized content corresponding to their own input and custom scenarios, and does not require the content provider to physically perform each requested custom scenario. A significant amount of content can be generated without any involvement of the content provider, aside from granting access to their digital likeness. The generative AI is trained to create a large array of adult scenarios/scenes in which the digital likeness may be placed. The scenarios may involve other users' digital likenesses. The generative AI of the system the present disclosure, also modifies the digital likeness according to user inputs. Some non-limiting examples of changes the user may make to the digital likeness are: the color of the likeness's hair, skin color, voice, height and weight, kinds of facial expressions, and sizes/proportions of different likeness body parts. A user applies changes to all content with a particular digital likeness, or may apply different changes whenever digital content is created. The user does not own the digital likeness, merely having permission to use it so long as the content provider/owner allows them access. The owner decides how the digital likeness is used and who has access to it. In some embodiments the content provider may own multiple digital likenesses of themselves with different variations. The content creator is able to define who has access to the different likenesses.

In some potential embodiments, the first user is not a content provider having a digital likeness of themselves, but is instead a third party who owns one or more digital likenesses for which a content consumer can purchase content for. The third party may be a single user of the system, or a group such as a corporation. In this case, a content provider may sell the rights to use their digital likeness to the third party. The third party then gives customers access to the digital likeness on a contractual basis, as a typical model would. The third party may dictate the permissions that content consumers have when generating content, and this may be further altered by the permissions/rights given to the third party by the original content provider.

Figure 4:
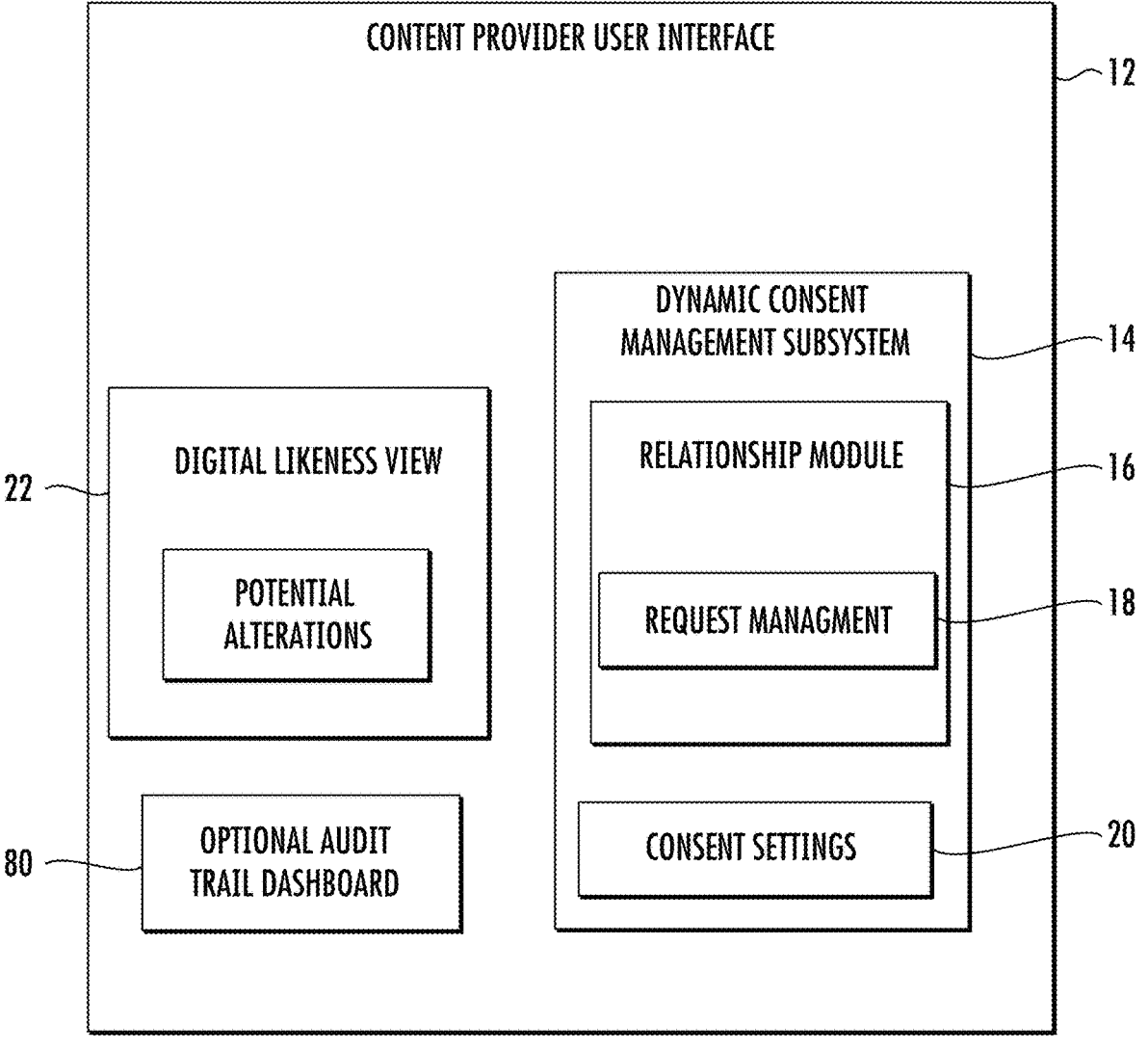
FIG. 4 is a diagram of the features of a content provider or model interface used by a model or content provider within the system of the present disclosure.
Figure 5:
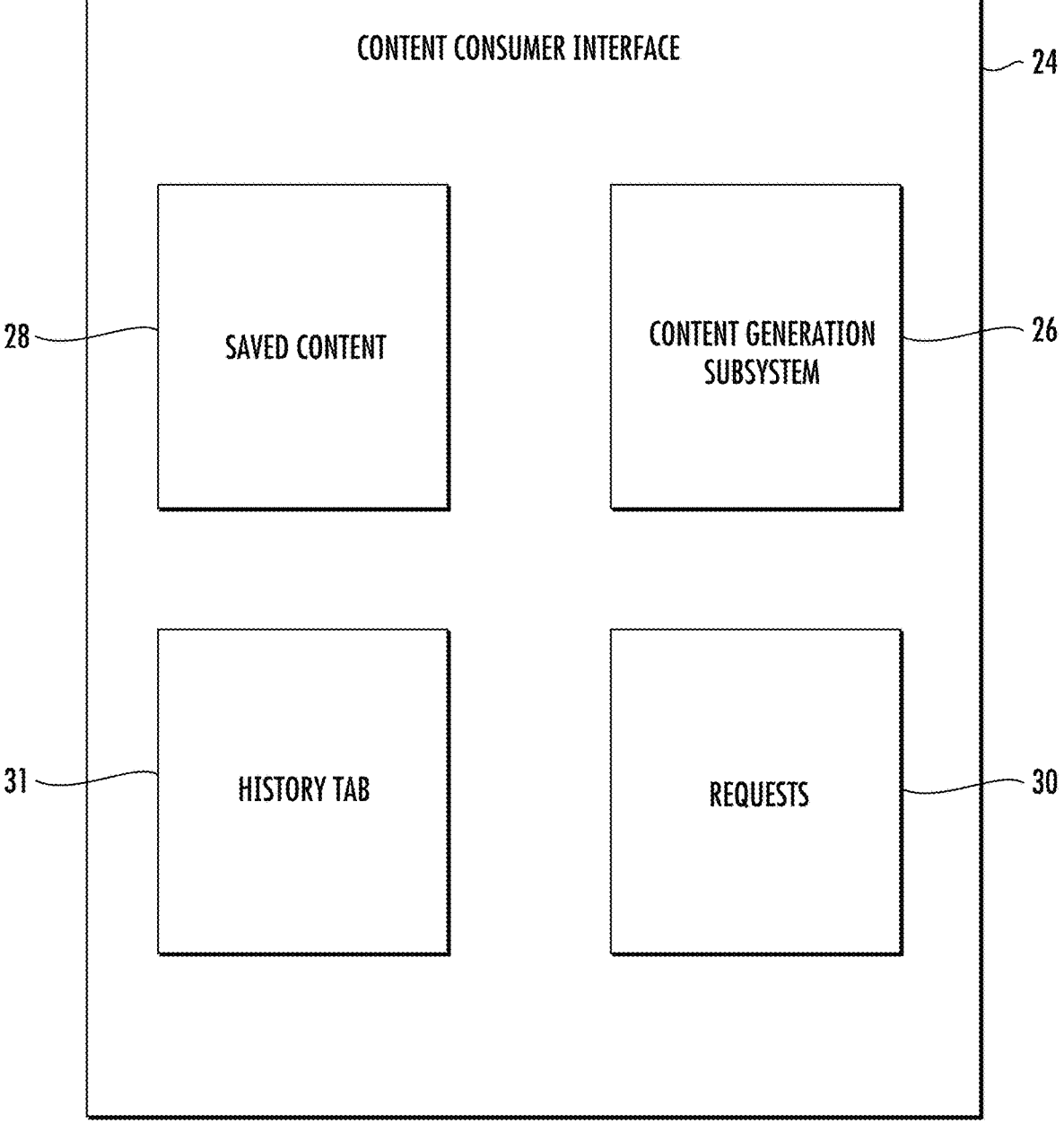
FIG. 5 is a diagram of the features of the second user or content consumer interface.

Each type of user has access to a different type of user interface based on whether the user is a content provider owning a digital likeness or a content consumer generating content with the content provider's digital likeness. The content provider's interface 12 includes a request management subsystem 18 that displays to a content provider permissions/content generation, approvals and permissions, and notifications for all requests (FIG. 4) in a request management subsystem 18. The content provider may also view their digital likeness and possible adjustments to it using a digital likeness management subsystem 22. A content consumer user interface 24 is directed towards providing an open environment for a user to create content (FIG. 5). The content consumer may view past generated content, preview new content before completing it, and view requests for permissions and whether they have been approved. A user who is both a content provider and a content consumer, is able to swap between the content provider user interface 12 and the content consumer user interface 24. In some embodiments, the content provider user interface 12 and the content consumer user interface 24 form a single overall content generation and content management user interface. Different subsystems within each respective UI may be arranged in a tile-based format, with different subsystems or functions organized in a visually clear manner. Either interface, or any text or portion thereof, may be resized or zoomed in to accommodate visual impairments. Both user interfaces may also have a navigation bar along a side or edge of the UI that the respective user uses to select different sections or subsystems within the UIs.

Figure 3:
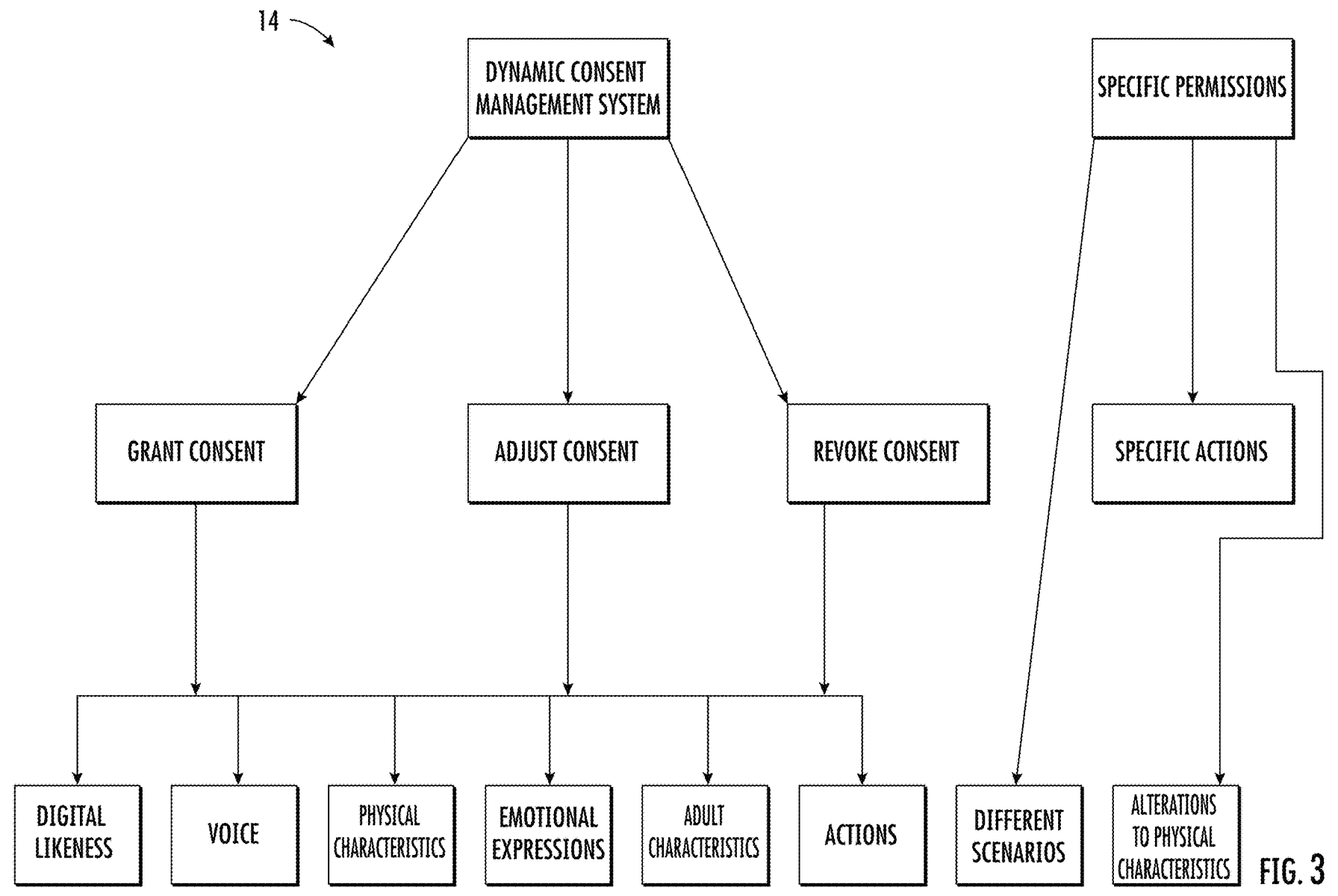

Within the content provider user interface 12 of the personalized adult content generation system 10 is a dynamic consent management subsystem 14 (FIG. 3). Here, the content provider manages how their digital likeness is utilized by other users. The subsystem has a variety of rules/consent settings 20 for how the second, or other users, can view and engage with the content provider's digital likeness. The settings/rules may be related to modifications to the user's digital likeness, modifications to audio associated with the digital likeness, actions the digital likeness may perform, the kinds of content another user may create with the digital likeness, whether the digital likeness is clothed or the level of clothing, as well as other parameters. A content provider could limit their likeness to only videos, images, animated graphic interchange format (GIFS), or any other type of generated media and in any particular combination. If the content type is a video, for example, the content provider could create settings within the dynamic consent management subsystem 14 to limit the runtime for any video made with the likeness to a predetermined time. These permissions/rules change how and what kinds of content can be generated by another user. If a content provider has limited their likeness to appear only in images, then another user generating content could not have the system produce a video, even if they prompt the system to do so.

The content provider user interface 12 has a digital likeness management subsystem 22 that displays a representation of the content provider's digital likeness that may then be viewed and modified with test alterations by the content provider. The representation may be a three-dimensional model of the content provider. The test alterations may correspond to the digital likeness's physical appearance or other features, emotional expression, and sexual gestures. The content provider may perform alterations based off of permissions stored in the dynamic consent management subsystem 14. Alternatively, the content provider may make non-conforming alterations that do not conform to the stored settings in order to see if they wish to allow the non-conforming alterations to be used by content consumers and adjust the settings accordingly. The altered digital likeness is displayed simultaneously with the unaltered digital likeness or any number of other, altered digital likenesses so the user can easily see the differences side by side. The user may also make permanent alterations to the original digital likeness. There may be physical features present in the user's real body they do want to replicate in digital form, or they may think the likeness is inaccurate. The content provider can create a plurality of altered digital likenesses with different characteristics. In some cases, permissions given out to content consumers may be correlated with the specific altered digital likeness. For example, an altered digital likeness may have a theme that cannot be changed by users making content with the likeness. As an example, the theme could be a holiday theme, with appropriate characteristics such as holiday themed clothes. Different altered likeness may be accessible based on the exact relationship between the content provider and content consumer(s), or even based on a payment plan or compensation framework. A digital likeness could be offered by sale/use with limited features for a small fee, while a larger fee will give a content consumer access to a different modified digital likeness with increased features as compared to the one with the smaller fee. Altered digital likenesses could be tailored to specific audiences or people to enhance their marketability.

To create the digital likeness, the content provider may either perform a media upload, or create one via three-dimensional scanning. The media upload may include one or more images or videos of the content provider that capture key physical features. Such physical features may include facial structure, body proportion, eye color, hair color, skin color, etc. Not all of the media needs to be explicit, and may include the content provider in everyday clothes, for example. In some cases, the media need not be explicit at all, with the content provider being able to add in explicit details later in the process. This ensures further control and privacy over the content provider's appearance. The systems of the present disclosure may include a digital likeness production algorithm that builds the 3D digital likeness based on the information provided in the uploaded media. The digital likeness is an accurate reflection of the content provider, incorporating their key physical traits. A 3D scan of the content provider would be more accurate, and would produce a better reflection of the content provider's physical traits to the system. Exemplary systems for 3D scanning include a LiDAR scanner or 3D scanning software onboard a content provider's mobile computing device. A 3D scan may also be performed while the user is clothed. A content provider's voice characteristics are also associated with the digital likeness. The content provider gives one or more audio samples with their voice to the system in order to produce a voice model for the digital likeness.

Once an initial digital likeness is created, the content provider is able to modify it as desired. Because all modifications are controlled by the content provider, they can have better control over their own privacy. Modifications need not conform to the content provider's true, real-life appearance. The content provider can fine-tune their likeness using a set of manual customization sliders and adjustment tools. These tools allow users to adjust features including but not limited to: facial features, body dimensions, and skin tone. Once the voice is captured, users can fine-tune aspects such as pitch, speed, and emotional tone. This allows for more dynamic voice interactions in content creation, whether for general or adult content. Alternatively, the modifications may be made by a generative AI system in response to content provider prompts, which may be textual, or comprise media such as images or videos. The content providers can choose to generate a nude model of their likeness. The system provides sliders and tools for adjusting physical details relevant to adult content. The content provider may also define specific intimate gestures, emotional expressions, and other actions used as part of adult content. Although the present disclosure contemplates the use of the system for generation of adult content, a content provider does not need to add adult content features to their digital likeness. The digital likeness may be entirely non-explicit. Content providers can rotate, zoom in, and examine their digital likeness from different angles in a 3D preview window. This preview shows the likeness in both non-explicit and intimate modes, allowing content providers to make any final adjustments before confirming and saving the digital likeness. The digital likeness can be changed by the content provider afterward at any time, and the system updates the changes in real time to affect any content generated using the digital likeness.

The dynamic consent management subsystem 14 includes a relationship module 16 and consent settings 20. Consent settings are a series of content provider defined settings that dictate what other users/content consumers may do with the content provider's digital likeness. Content settings regulate modifications to the digital likeness, scenarios the digital likeness may be involved in, what users have access to the digital likeness, as well as other factors. The consent settings also work on a relationship basis, wherein the exact settings may be different based on the relationship between the content provider and the content consumer. Using the relationship module 16, the dynamic consent management subsystem 14 is able to identify user relationships and automatically determine permissions for different users based off of the relationship between the content provider and the other users/content consumers. Additionally, the kinds of content able to be generated may be different user to user. The content provider may set granular permissions for each different user here, based on their relationship, or they may make blanket changes/permissions. The relationship module 16 may have a number of preset relationships with present parameters for how the users in the relationship may generate content. A content provider may modify how each relationship type alters the permissions as desired. For example, if an exemplary content provider is in a romantic relationship with an exemplary content consumer, they may give the content consumer permissions to create content featuring specified sexual scenarios or physical modifications to the digital likeness, with the permissions able to be broadened as the relationship advances. The relationship module 16 stores different types/tiers of relationships between the content provider and other users, which then apply permissions to those other users automatically according to their type, context, and consent settings 20. A content provider may also have multiple simultaneous relationships defined by whether they are a romantic/personal relationship or a contractual model/customer relationship. Some content consumers may have to request permission for certain content or physical modifications, while others will not. A content provider could have a set of permissions set for a relationship partner who has access to their content for free, as well as a set of paying customers with a different set of permissions defined by their payment terms. In certain scenarios, the content provider could allow a content consumer to make a certain category of content/modifications without permission, while still enforcing that the content consumer ask for permission in other cases. This is useful for users with a less developed relationship, but where the content consumer often requests the same kind of content.

The consent settings 20 dictating use of a content provider's digital likeness may be changed at any time within the dynamic consent management subsystem 14. These changes are reflected in real time throughout the entire system, so any subsequent use of the digital likeness adheres to the new changes to the permissions. The changes to consent settings would also be based on the relationships between users, so that certain content consumers may be exempt from the changes. Access to previously generated content may be automatically revoked if it does not conform to the new permissions in the consent settings 20. However, a content provider/model could still allow old content to be "grandfathered in" and be accessible to the content consumer who generated it, but the content consumer would still be limited to the new conditions on any future generated content. This may be used for paid content, wherein a customer/content consumer would be unhappy to lose out on something they had legally purchased. Alternatively, access to certain content may be terminated or changed in order to fit the new terms and conditions. For example, if there was existing content wherein a digital likeness had a voice that did not conform to the digital likeness's content provider's voice, the voice could be edited by the content owner to be the content provider's voice if the content provider updated the conditions to stop any changes of the voice of their digital likeness. Access may also automatically be revoked upon the end of a content consumers subscription, if they were receiving content access in exchange for monetary payments. Access could be restored after the subscription is renewed or after a payment is made by the content consumer. If a subscription ends, the content generated during the duration of the subscription may be deleted automatically. In other cases, access to the content generated during a subscription term may be restored upon renewal of the subscription. In other scenarios, the content provider is in a relationship with the content consumer, and is able to revoke access to content by the content consumer at any time and for any reason. Some consent settings may indicate that certain sexual acts or content will need to be explicitly approved by the content provider in all cases. This is typical with more extreme sexual fantasies, and the content provider may allow content consumers to create content of the extreme sexual fantasy on a case-by-case basis according to their comfort level or personal boundaries. However, the consent settings could dictate that all modifications/content generated must be approved first, allowing the content provider to have complete control over what content is generated.

The content provider user interface 12 includes an overview of requests from other users/content consumers. These requests are directed to specific manipulations of the content provider's digital likeness. The overview of requests may include pending requests as well as a historical record of all requests made previously that have been approved, denied, or flagged for further review. When another user/content consumer attempts to generate content, but is blocked from making certain changes/action for lack of permission, then the user/content consumer may make a request for permission to the digital likeness's owner. The request then appears to the content provider as a notification in a side bar panel, which may show the user/content consumer that made the request as well as a summary of the physical modifications and scenario that they are requesting. The notifications are generally shown as tiles containing a summary of the request, including the physical appearance modifications or sexual content manipulations. Notifications can also appear as pop-ups or push notifications (if the system is an application on a user's phone or computer). They may be further color coded to indicate request types or the extremity of the sexual scenario or modification requested, and may be categorized as at least "pending approvals", "sensitive content requests", and "audit/tracking updates." The notifications also may have an "accept" link and a "deny" link which the content provider may select to respond to the request without having to move elsewhere in the system. The requests displayed and organized by the content provider user interface 12 into a list of pending requests that have yet to be responded to by the content provider, and they are further organized by the type of manipulation requested. The system provides the specific category of sexual act being requested. Possible categories include, but are not limited to kissing, intimate touching, penetrative acts, oral sex, BDSM, role playing scenarios (within fantasy contexts that may involve power dynamics or other consensual acts), and extreme sexual fantasies (covering acts that are typically outside conventional intimacy, fulfilling more niche or fetish-driven requests). Displaying categories allows the content provider to have a better idea of what they have consented while reviewing old requests or before they allow new requests. While some requests will involve both physical modifications as well as intimate acts/scenarios, they are approved separately, even if they are a part of a single prompt from the content consumer. The content provider may need to ask for permission to make physical modifications to the digital likeness as well. Such physical modifications can be categorized by at least hair color/style, body proportions, facial features, tattoos/body art, skin tone, and gender/sex related modifications. While the system provides explicit details about the type of sexual act or physical modification requested, it maintains the privacy of the content consumer by not disclosing the broader context or fantasy involved in the request. For instance, the owner will see that a request for penetration or a BDSM act has been made but will not be provided with additional context such as the fantasy scenario or narrative that drives the request. Requests also display the user that made the request, and possibly any relationship that the user/content consumer has with the content provider. The content provider may be able to view their original digital likeness alongside the requested modified digital likeness simultaneously. If the requests involve nudity, sexual acts, or other sensitive material, then the sensitive portions of the digital likeness may be blurred until the content provider chooses to review them. This is done in a comparison panel, which shows each likeness next to each other and a series of action buttons. The action buttons include, but are not limited to, "approve", "deny", "request modification", and "send to review", and request would be acted upon by the system according to the selected button. The content provider also has access to a request history, which is a log of all requests made by other users, the users that made the requests, and what they requested.

Using the request modification, the content provider may be able to suggest modifications or alternatives to content requested by the content consumer. For example, if the content consumer submits a prompt for a sexual act or physical change that the persona owner feels uncomfortable with, instead of outright denying the request, they could propose an alternative (e.g., changing the nature of the intimate act or altering the degree of the physical modification). Both users can find a compromise between what was requested and what was acceptable to the content provider.

The content consumer user interface 24 includes a content generation subsystem 26. The content consumer primarily interacts with the content generation subsystem 26 via inputting prompts. Typically, the prompts are textual but they may include other kinds of data/information that a content consumer may input. Images could be input, for example, so that the image is used to assist in content generation. Aspects of the inputted image may be present in the final content. There may also be a series of sliders and/or dropdown menus that display preset modifications that the user may make. A preview window with a representation of the content provider's digital likeness, which may be a three-dimensional model, is displayed to the content consumer on a central portion of their screen. The model is fully interactive, allowing the user to rotate, zoom, and modify the persona. Users can apply changes to physical traits (e.g., height, body shape), emotional expressions, or sexual gestures in real-time. Next to the preview window is a toolbar displays icons, sliders, dropdown menu, or other selecting means for various modification tools, such as physical alterations, emotional expressions, voice settings, and sexual gestures. The toolbar may have its options organized by general modifications, or sensitive content modifications, and may flag certain options as needing permission from the content provider. The modifications made with the toolbar may be used in addition to the content consumer made prompts or in place of them.

Figure 6:
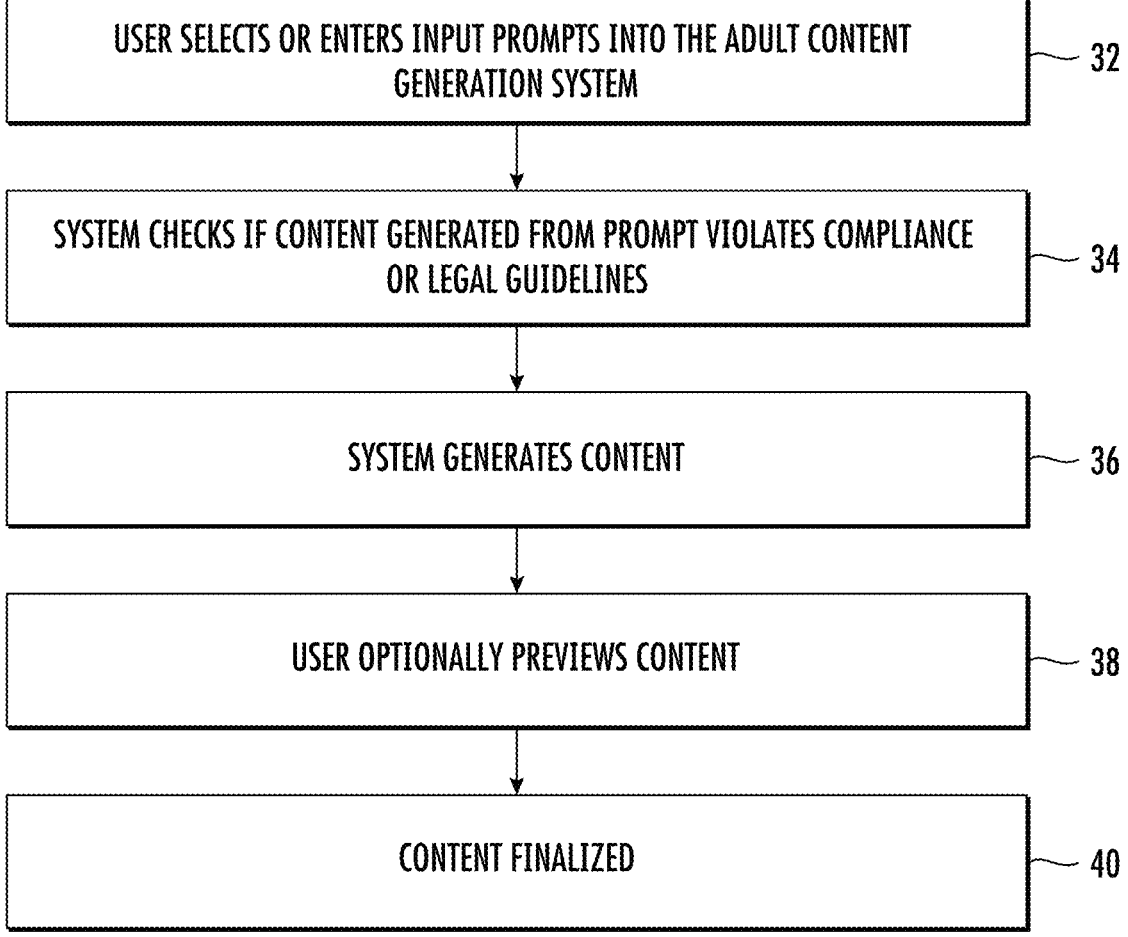
FIG. 6 is a process flow diagram of the process of creating adult content using the systems of the present disclosure.

The AI system integrated into the system of the present disclosure takes the input, whether it be text or other data, and generates an initial piece of content from it. The content consumer may preview this content before it is finalized to see if it matches their requirements/desires or needs further improvement. The content consumer may then input additional prompts into the content generation subsystem 26, which are then used to modify the existing original generated content, or generate new content taking aspects from the original generated content. A content consumer may repeatedly input a prompt, review the generated content, then input additional prompts until a satisfactory piece of content is obtained iteratively. FIG. 6 shows the process flow for creating content using the content generation subsystem 26. First, the content consumer inputs a prompt 32 into the content generation subsystem 26. The content generation subsystem 26 then checks the prompt for compliance 34 with the consent settings 20 of the owner of the digital likeness that is being used in the prompt. The content generation subsystem 26 then generates the initial piece of content 36. The content consumer iteratively previews and edits 38 the content with additional prompts. The content is finalized 40 after the content consumer is satisfied with the final product.

If the content consumer is offline, such as if they are using a software application version of the system onboard the user operated computing system without having an internet connection, they will still be able to initiate content generation. However, if the content requires permissions that content consumer does not have, they will not be able to finish content generation until the internet connection is restored and a request may be sent out. Pending requests and permissions updates are updated/sent out when the content consumer/provider is online. The content consumer will not be able to view any generated content until the system is back online.

Also included in the content consumer user interface 24 is a content storage and viewing subsystem 28. Here, the second user may see all content they have previously generated and saved within the system. The content may be organized by type (images, videos, etc.), by date created, by model if applicable, and any other way the content consumer chooses. The content may be filtered or resorted by their characteristics so that the content consumer can easily find a previously generated piece of content. Some content may be marked to indicate it as "favorited" content. The content consumer user interface 24 would also include a request creation subsystem 30. The request creation subsystem 30 is accessible while the content consumer is generating content, and the system of the present disclosure may automatically display the request creation subsystem 30 to the content consumer when they input a prompt that does not conform to the permissions given to them by the content provider's consent settings 20. The request may be reviewed by the content consumer from a summary box showing all the requested modifications as well as any flagged sensitive content. The status of the request is shown after the content consumer submits the request. The status updates in real-time when the content provider decides to approve or deny it. The content provider may also inform the content consumer to modify their request so that both users can reach a finalized piece of media both approve of. The content consumer will receive notifications when the status of their request(s) is updated. The notifications may pop up in a side bar on the content consumer UI. There may also be a history tab 31 which displays all previous requests, organized by submission date and approval status. This tab also shows if any requests were flagged for manual review or had been included in AI training.

FIG. 7 shows the process flow for a content consumer to request permission to generate particular content. In general, a content consumer will first try to generate content with a content provider's digital likeness that does not conform to the content provider's consent settings 20. Then, the content consumer submits a request for permission 42 via the request creation subsystem 30 accessible through the content consumer user interface 24. The request is the sent 44 to the content provider, wherein a notification 46 will appear in the request management subsystem 18 of the content provider user interface 12. As stated before, the notification may come with an "accept" link and a "deny" link. The content provider then decides whether to grant the request 48 and selects the chosen option in the notification. The status of the request 50 is returned to the content consumer. A notification of the status 52 may appear on the content consumer user interface 24, possibly by the request creation subsystem 30.

When a model accepting monetary compensation accesses the personalized adult content generation system via the model portal, they will be brought to a model dynamic consent management subsystem. This system is similar to the typical content provider's dynamic consent management subsystem; however, it incorporates a payment transaction system with regards to it permission settings. In effect, the model may allow different permissions based on payments made by other users. These payments could be one-time payments, or they could be repeated payments made as part of a subscription model. The number of options, or amount of control, a content consumer could have over the digital likeness of the model could be scaled with the size of payments the content consumer makes. The model is able to set up a tiered payment system, where a low payment only grants a certain amount of access, and a higher payment will result in more access than the low payment. If under a subscription model, the content consumer would have continual access as long as they make payments, but they will still be limited by their permissions given to them by the model. A content consumer could be limited by: how many pieces of media they can produce over a unit time, the length/runtime of the media, permissions to change the appearance/traits of the digital likeness, actions that the digital likeness is allowed to perform, etc. The limits/conditions can be changed by the model when the payment system is changed. In some cases, single instances of generated content may be purchased by content consumers, wherein the content consumer would only have access to those single instances of generated content. An individual instance of generated content may have different pricing from another instance of content depending on the model's consent settings 20. An instance of content that is a still image may be priced less than a piece of content that is a video. The pricing information may be presented to the content consumer as they are generating the content. For example, a dialog could appear that lists the costs of the digital likeness performing different actions, appearing in different types of media, particular modifications of the digital likeness, runtime of media, etc. Each model has a customer facing interface wherein any user/content consumer can view samples or subsets of content. Content displayed on the customer facing interface serves as a showcase of what a content consumer would be able to do, but does not contain full length content itself. The showcase content is determined by the model so that they can prevent content with particular characteristics from being saved/created without their permission.

The personalized adult content generation system 10 of the present disclosure would allow users to submit payments regardless of currency. A content consumer purchasing content from a content provider may be a different country/region than the content provider having a different currency. Currency will need to be exchanged for the local currency of the content provider or to whatever currency they are using. Payments may be facilitated through a debit or credit card. The debit or credit card information may be saved onto the system so the user may make automatic payments or repeated one-time payments. Instead of cards, the banking information of the user can be used to perform wire transfers. Banking information may be saved or entered for a one-time payment. Any information saved into the system is encrypted to protect the purchasing user/content consumer. In a preferred embodiment, payments are blockchain based such that the are not able to be manipulated and are more secure. Every time a payment is made, it is entered in a record, also known as a block. Each block is linked together with other blocks cryptographically, forming a chain of blocks. The blocks contain information about the transaction, including date/time it was made, as well as how much the transaction was. Transactions may also be made with a block chain based non-fungible currency, such as Bitcoin, Etherium, and Litecoin.

Payment to commercial accounts can be facilitated by a smart contract. The smart contract is effectively enforced by the software of the personalized adult content generation system. User actions as well as any generated content is subjected to the terms of the smart contract. The smart contract allows the system to regulate content automatically, and requires no human intervention nor enforcement. The smart contract also allows the system to collect payments from users automatically according to the contract terms. If the content consumer has saved a payment method, the smart contract directs the software to draw from it automatically at predetermined intervals. These intervals could be daily, monthly, quarterly, yearly, or any other appropriate time interval. In other cases, reminders may be sent to the content consumer to make a payment, possibly with the threat of losing access to the content temporarily or permanently. A typical terms and conditions will also need to be read and understood by a prospective user before they are allowed onto the system. There may also be physical contracts between users dictating how content is meant to be used, however, terms in physical contracts may not be enforced automatically by the systems of the present disclosure. Legal action may be taken upon violation of the physical contracts.

In a step to secure user data, such as the content provider's digital likeness, user personal information, content provider consent setting, content consumer purchases or payment history, user data is encrypted. The prompts made by content consumers will also be encrypted, so that only the content provider will be able to view them. The data is turned into ciphertext while in the database, only allowing users or accounts with cryptographic key to access it. Users who own the information will have the key, and thus complete access. For content consumers that have been given partial access to a content provider's data, the personal data will be partially decrypted so that the content consumer may view the data they have access to. This enables the users to remain protected by allowing necessary interactions and information transfers between users for the operation of the system. Various encryption techniques may be used, including symmetric and asymmetric encryption. Examples of possible encryption algorithms are, but not limited to, 3DES, AES, RSA, Twofish, RC4, and ECDSA.

Content that has been previously generated is stored in a secure database. The database may be a local database on a user operated computing device owned by the content provider or content consumers. Alternatively, the database may be located on an external server, and accessible to users through the system user login portal. Content stored on the secure database may be repeatedly viewed by the content consumer. The content consumer may also make modifications to the existing content. A content consumer could create a copy of an existing content file then and modify the copy, ensuring the original exists untampered next to the new edited copy. The systems of the present disclosure also prevent sharing of adult content without permission from the content provider. In some embodiments, the content consumer is prevented from replicating generated content off of the secure database. The content could be stored entirely within the system's database, similar to a streaming site. This ensures a content consumer would not be able to have a copy of generated content stored on their computer or elsewhere separate from the system, as well as preventing them from sharing it with other people that are not using the system. The content provider can also revoke access to content generated with their digital likeness to the content consumer, and the systems of the present disclosure prevents the content consumer from saving or moving any of the content they have lost access to. The system may also have software that inhibits any user viewing content from their computing device screen from capturing an image or video of their screen. For example, the screen could become dark and cover the generated content when the system detects the user inputting key binds for screenshots or recording. In alternative embodiments, the content consumer could be allowed to download content externally, but a notification could be sent to the content provider owning the digital likeness that the content has been downloaded elsewhere, although this is not preferred. This lets the content provider keep track of potential "leaks" of their digital likeness and can aid in determining whether or not to alter their consent settings and relationships within the relationship module.

In some embodiments, the system 10 of the present disclosure prevents the generation of illegal content. Primarily, the system prevents content generation involving minors. Any user, whether they are providing their digital likeness for use or only consuming generated content, must undergo age verification to prevent the proliferation of harmful and illegal content. An age verification system is integrated into the system of the present disclosure. A user must pass through the age verification system when they first create an account. An account may not be created until the user verifies their age. In some embodiments, the system may incorporate a third-party software that will verify the user's age. The system is linked to the third-party software and is able to securely share personal information between the system and the third-party software. When a user creates an account, they will be redirected to the third-party software, possibly via a web link. Once they have entered the third-party software, they can enter information to verify their identity and age. A confirmation that the user is who they claim to be is sent to the system of the present disclosure, and the user may be redirected back to the system. An example of third-party software useable by the system, is ID.me.

In order to create realistic personalized content, adult content generative artificial intelligence system is trained on a wide range of data. The system is provided with a variety of adult scenarios. Training data may include videos, images, audio, or written text, but is not limited to these types of data specifically. The data is ethically sourced, meaning that the data is not obtained illegally, does not contain illegal content, and may be publicly available content or licensed media (purchasable media). The data is not pulled from anywhere online, but only from specifically vetted sources, and complies with local laws/regulations as well as intellectual property laws.

The generative AI system of the present disclosure may be trained either using a global training model, or a personalized training model. The global training model uses data from across the entire system to improve its content generation abilities for every user. Users may opt in or opt out of this process. Users who opt out will not have any content they make or are featured in used to training data for other users. The personalized training model only uses content from a particular user for training, which improves the overall experience for that user, but the data would not be available to other users without permission. In the case of a content provider, a personalized model may only utilize data from content generated using their likeness from authorized content consumers. A user may opt out of either the personalized training model or the global training model, or both models. In any case, there are safeguards to prevent unauthorized usage of generated content for training purposes.

In some embodiments the adult content generative artificial intelligence system of the present disclosure further protects user privacy by selectively omitting certain user information from its training data. The learning environment of the AI system is shielded to protect user's personal information and likeness. For example, a content provider may set the system so that any content made with their likeness in only used for training with respect to creating new content for their partner. This ensures that the content made for that partner is more realistic and improves over time The AI system may be trained via supervised learning, wherein human trainers are involved by labeling data, and via unsupervised learning, wherein the AI system reviewed data to seek out patterns without human involvement. In a preferred embodiment, the AI system could be fed content including different adult scenarios. The scenarios could be labeled, typically by a human, so that the AI system may learn to identify different scenarios such that it can replicate said scenarios when prompted by a content consumer. Alternatively, the AI system may be trained using a generative adversarial network (GAN) to enhance the content's realism, although the system may accommodate a wide variety of AI training techniques. If a user's digital likeness is used for training, it is possible that the system could take aspects of the digital likeness and reuse them for future generated content. A content provider may not want their appearance being reused for content generation by another user the content provider does not know and otherwise does not have access to their content. A content provider may configure the system to avoid using any data relating to their digital likeness for training purposes. In other cases, the content provider may selectively determine what aspects of their digital likeness or personal data is used for training purposes. Some data may be used for training in order to create specific content or content for specific people on a permission basis. The system incorporates AI-driven filtering mechanisms designed to flag sensitive content (e.g. sexual acts, intimate gestures, and emotional expressions) for review. These filters automatically identify content that involves explicit material, ensuring that it undergoes manual review before it can be included in the AI training dataset. The system cross-checks the content with the content provider's consent settings in the dynamic consent management system. Only if the content aligns with the content provider's consent settings will it be flagged for final review and potential inclusion in training. Flagged content is categorized by level of sensitivity. A sexual act would be higher sensitivity than simply kissing, for example. Content providers have the option include or modify any flagged content in AI data training.

A stated earlier, if the systems of the present disclosure will display audit trails if required by legal or ethical standards. The content provider user interface would include an optional audit trail dashboard 80, although the audit trail dashboard may also be present in the content consumer user interface as well. The audit trail dashboard would include timeline-based logs that show when content was flagged for AI training, whether it was included in the global model or personalized model, and whether it involved adult content. Transparency reports are available to users to show how their content was used for training, and may include details on specific content that was flagged for inclusion in training, whether the content was reviewed for sensitive material, and whether the content was used for global training or confined to the user's personalized model. This ensures that a content provider is fully aware of how their information is used at all times, and is able to make changes if they are not comfortable with the way their information is being used currently. The system is fully compliant with data protection regulations like the General Data Protection Regulation (GDPR) and the California Consumer Privacy Act (CCPA). The users may opt in or out of the detailed audit tracking. There may be a checkbox or toggle to enable detailed consent logs as well as to request transparency reports.

It is to be understood that variations and modifications can be made on the aforementioned structures and methods without departing from the concepts of the present disclosure and claimed invention, and further it is to be understood that such concepts are intended to be covered by the following claims unless these claims by their language expressly state otherwise.

What is claimed is:

1. A method of generating customized adult content, wherein the customized adult content conforms to one or more content provider determined settings, the method comprising the steps of:

providing an overall adult content generation system comprising a content consumer system having content consumer graphical user interface and a content provider system having a content provider graphical user interface, wherein the content consumer system comprises a content generation subsystem having a generative artificial intelligence system, and wherein the content provider system comprises a digital likeness corresponding to a content provider and a dynamic consent management subsystem having one or more defined relationships between the content provider and at least one content consumer and the one or more content provider determined settings, and wherein the one or more content provider determined settings are shared by the dynamic consent management subsystem with the content generation subsystem and is applied to the digital likeness;

the content generation subsystem receiving an input from a content consumer using a content consumer operated computer input device, wherein the input is at least one content consumer determined parameter for generating adult content that includes the digital likeness and is artificially generated by the generative artificial intelligence system;

analyzing the input using the content generation subsystem to verify that the input conforms to the one or more content provider determined settings;

generating customized adult content using the generative artificial intelligence system if the input conforms to the one or more content provider determined settings, and displaying the customized adult content to the content consumer on a display of a computing device operated by the content consumer, and wherein the customized adult content conforms to the at least one content consumer determined parameter of the input; and wherein the content consumer graphical user interface is displayed to the content consumer on the display of the computing device operated by the content consumer.

2. The method of claim 1, wherein the customized adult content is in a format chosen from the group consisting of: video, images, and animated GIFs, and wherein the customized adult content may include audio.

3. The method of claim 1, wherein the computing device comprises central processing unit, the content consumer operated computer input device, the display, and a system memory having an operating system, a BIOS driver, a permanent data store, and any number of application programs.

4. The method of claim 1 further comprising a step of refining the customized adult content to create refined customized adult content, wherein the step comprises:

the content generation subsystem receiving an additional input from the content consumer comprising at least one additional content consumer determined parameter; analyzing the additional input using the content generation subsystem to verify that the additional input conforms to the one or more content provider determined settings; and generating the refined customized adult content using the generative artificial intelligence system if the additional input conforms to the one or more content provider determined settings, and displaying the refined customized adult content to the content consumer on the display of the computing device operated by the content consumer, and wherein the customized adult content conforms to the at least one additional content consumer determined parameter of the input.

5. The method of claim 4, wherein the step of refining the customized adult content is repeated one or more times.

6. The method of claim 1, wherein the overall adult content generation system is stored 1) on an external server separate from and in signal communication with a content consumer operated computing device and a content provider operated computing device, 2) wholly on a content consumer operated computing device and a content provider operated computing device and wherein the content provider operated computing device and wherein the content consumer operated computing device are in signal communication with one another, or 3) partially on an external server separate from and in signal communication with a content consumer operated computing device and a content provider operated computing device and partially on the content consumer operated computing device and the content provider operated computing device.

7. The method of claim 1, wherein the digital likeness has a digital visual appearance that is displayed to the content consumer and/or the content provider and wherein the digital visual appearance corresponds to a physical appearance of the content provider.

8. The method of claim 7, wherein the at least one content consumer determined parameter comprises a content consumer determined alteration to the digital visual appearance of the digital likeness, and wherein the digital likeness is an altered digital likeness having the content consumer determined alteration and wherein the altered digital likeness is in the customized adult content.

9. The method of claim 7, wherein the digital likeness further comprises an audio component, a behavioral component, and at least one emotional or facial expression.

10. A method of generating customized content, wherein the customized content conforms to one or more content provider determined settings, the method comprising the steps of:

providing an overall content generation system comprising a content consumer system having content consumer graphical user interface and content providing system having a content provider graphical user interface, wherein the content consumer system comprises a content generation subsystem having a generative artificial intelligence system, and wherein the content generation subsystem comprises at least one digital object and a dynamic permission management subsystem having one or more defined relationships between a content provider and at least one content consumer and one or more content provider determined settings, and wherein the one or more content provider determined settings are shared by the dynamic permission management subsystem with the content generation subsystem and are applied to the at least one digital object;

the content generation subsystem receiving an input from a content consumer using a content consumer operated computer input device, wherein the input is at least one content consumer determined parameter for generating content that includes the at least one digital object and is artificially generated by the generative artificial intelligence system;

analyzing the input using the content generation subsystem to verify that the input conforms to the one or more content provider determined settings;

generating customized content using the generative artificial intelligence system if the input conforms to the one or more content provider determined settings, and displaying the customized content to the content consumer on a display of a computing device operated by the content consumer, and wherein the customized content conforms to the at least one content consumer determined parameter of the input; and and wherein the content consumer graphical user interface is displayed to the content consumer on a display of the computing device operated by the content consumer.

11. The method of claim 10, wherein the customized content is customized adult content and the at least one digital object is a digital likeness having a visual appearance that corresponds to a physical appearance of the content provider, and wherein the at least one content consumer determined parameter is an adult scenario in which the digital likeness is a part of.

12. The method of claim 10, wherein the customized content is in a format chosen from the group consisting of: video, images, and animated GIFs.

13. The method of claim 10, wherein the computing device comprises central processing unit, the content consumer operated computer input device, the display, and a system memory having an operating system, a BIOS driver, a permanent data store, and any number of application programs.

14. The method of claim 10 further comprising a step of refining the customized content to create refined customized content, wherein the step comprises:

the content generation subsystem receiving an additional input from the content consumer comprising at least one additional content consumer determined parameter; analyzing the additional input using the content generation subsystem to verify that the additional input conforms to one or more content provider determined settings; and generating the refined customized content using the generative artificial intelligence system if the input conforms to the one or more content provider determined settings, and displaying the refined customized content to the content consumer on a display of the computing device operated by the content consumer, and wherein the customized content conforms to the at least one additional content consumer determined parameter of the input.

15. The method of claim 14, wherein the step of refining the customized content is repeated one or more times.

16. The method of claim 10, wherein the overall content generation system is stored 1) on an external server separate from and in signal communication with a content consumer operated computing device and a content provider operated computing device, 2) wholly on a content consumer operated computing device and a content provider operated computing device and wherein the content provider operated computing device and the content consumer operated computing device are in signal communication with one another, or 3) partially on an external server separate from and in signal communication with a content consumer operated computing device and a content provider operated computing device and partially on the content consumer operated computing device and the content provider operated computing device.

17. A content creation and management system for the creation of customized content involving a digital likeness owned by a content provider, the content creation and management system comprising:
  a content consumer system having a content consumer graphical user interface displayed to a content consumer on a display of a content consumer operated computer system, and wherein the content consumer system comprises:
    a content generation subsystem having a generative artificial intelligence system;
    a request creation subsystem that is in communication with the content generation subsystem such that the request creation subsystem may be accessed by the content consumer while the content generation subsystem is generating content;
  a content provider system having a content provider graphical user interface displayed to the content provider on a display of a content provider operated computer system, and wherein the content provider system comprises:
    a dynamic permission management subsystem comprising a digital likeness management subsystem, wherein the digital likeness management subsystem includes at least one digital likeness corresponding to the content provider, and wherein the digital likeness has a digital visual appearance that corresponds to a physical appearance of the content provider, and wherein the dynamic permission management subsystem further comprises at least one relationship between the content provider and the content consumer, and wherein the dynamic permission management subsystem further includes at least one content provider determined setting that is associated to the at least one digital likeness and that depends on the at least one relationship;
    a request management subsystem in signal communication with the request creation subsystem, and wherein the request management subsystem accesses the at least one content provider determined setting; and
  wherein the content creation and management system are stored on an external server separate from the content consumer operated computer system and the content provider operated computer system.

18. The content creation and management system of claim 17, wherein the content consumer operated computer system and the content provider operated computer system both comprise a central processing unit, a user input device, a display, and a system memory having an operating system, a BIOS driver, a permanent data store, and any number of application programs.

19. The content creation and management system of claim 17 to the at least one content provider determined setting comprises one or more allowed alterations to the at least one digital likeness.

20. The content creation and management system of claim 19, wherein the content consumer system further comprises a content viewing subsystem, wherein customized content that has been previously generated by the content generation subsystem is stored in the content viewing subsystem is displayed to the content consumer on a display of the content consumer operated computer system, and wherein the content viewing subsystem does not store and display customized content that does not conform to the at least one content provider determined setting.

* * * * *